US011635288B2

(12) United States Patent
Liu

(10) Patent No.: US 11,635,288 B2
(45) Date of Patent: Apr. 25, 2023

(54) SENSING METHOD FOR WHEEL ROTATION, WHEEL LOCALIZATION METHOD, AND WHEEL LOCALIZATION SYSTEM

(71) Applicant: Silergy Semiconductor Technology (Hangzhou) LTD, Hangzhou (CN)

(72) Inventor: Chikang Liu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/893,979

(22) Filed: Aug. 23, 2022

(65) Prior Publication Data
US 2022/0404137 A1 Dec. 22, 2022

Related U.S. Application Data

(63) Continuation of application No. 16/589,284, filed on Oct. 1, 2019, now Pat. No. 11,441,887.

(30) Foreign Application Priority Data

Oct. 15, 2018 (CN) .......................... 201811196246.5

(51) Int. Cl.
*B60C 23/04* (2006.01)
*G01B 7/30* (2006.01)
*G01D 5/12* (2006.01)
*G01L 17/00* (2006.01)
*B60T 17/18* (2006.01)

(52) U.S. Cl.
CPC ............ *G01B 7/30* (2013.01); *B60C 23/0425* (2013.01); *B60C 23/0474* (2013.01); *G01D 5/12* (2013.01); *G01L 17/00* (2013.01); *B60T 17/18* (2013.01)

(58) Field of Classification Search
CPC ... B60C 23/0425; B60C 23/0474; G01B 7/30; G01D 5/12; G01L 17/00; B60T 17/18
See application file for complete search history.

(56) References Cited

U.S. PATENT DOCUMENTS

| 6,166,698 | A  | 12/2000 | Turnbull et al. |
| 7,224,267 | B1 | 5/2007  | Ellis |
| 8,095,333 | B2 | 1/2012  | Penot et al. |
| 8,421,612 | B2 | 4/2013  | Sugiura |
| 8,922,359 | B2 | 12/2014 | Lim |
| 9,420,408 | B2 | 8/2016  | Liu |

(Continued)

FOREIGN PATENT DOCUMENTS

| CN | 102862450 A  | 1/2013  |
| JP | 2012531360 A | 12/2012 |
| JP | 2013154687 A | 8/2013  |

*Primary Examiner* — Tarun Sinha
*Assistant Examiner* — James I Burris, Jr.

(57) ABSTRACT

A method of sensing wheel rotation can include: sensing magnetic force information in an environment of a wheel by a magnetometer to obtain measured magnetic force information; generating relative magnetic force information by performing mathematical operation processing in accordance with the measured magnetic force information, where the relative magnetic force information does not change with geomagnetic field and does change with a rotation angle of a wheel; and obtaining angle information related to the rotation angle of the wheel in accordance with the relative magnetic force information.

10 Claims, 8 Drawing Sheets

(56) References Cited

U.S. PATENT DOCUMENTS

| | | | |
|---|---|---|---|
| 2006/0010992 A1* | 1/2006 | Shima | B60C 23/066 |
| | | | 73/862.69 |
| 2009/0102636 A1 | 4/2009 | Tranchina | |
| 2011/0205047 A1 | 8/2011 | Patel et al. | |
| 2016/0129736 A1 | 5/2016 | Peine et al. | |
| 2017/0282655 A1 | 10/2017 | Liu et al. | |
| 2018/0023977 A1* | 1/2018 | Park | B60C 23/0416 |
| | | | 324/207.2 |

* cited by examiner

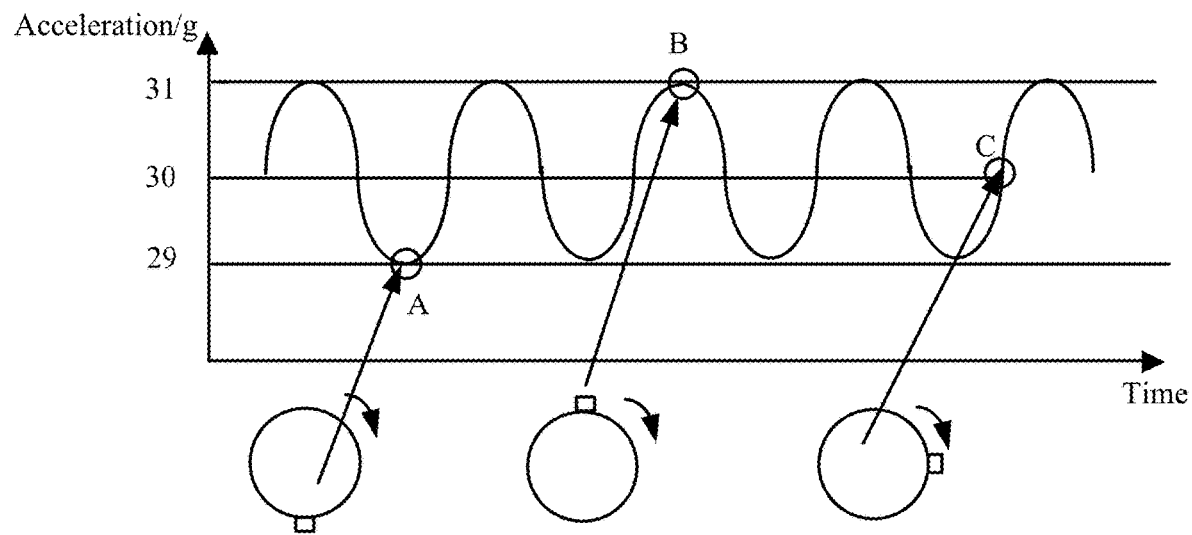
FIG. 1 (conventional)

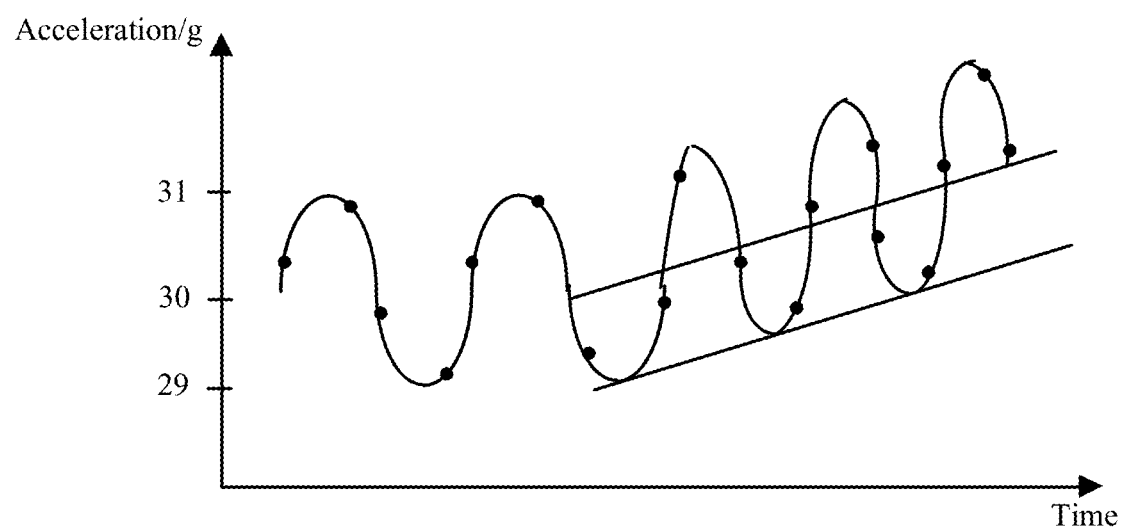
FIG. 2 (conventional)

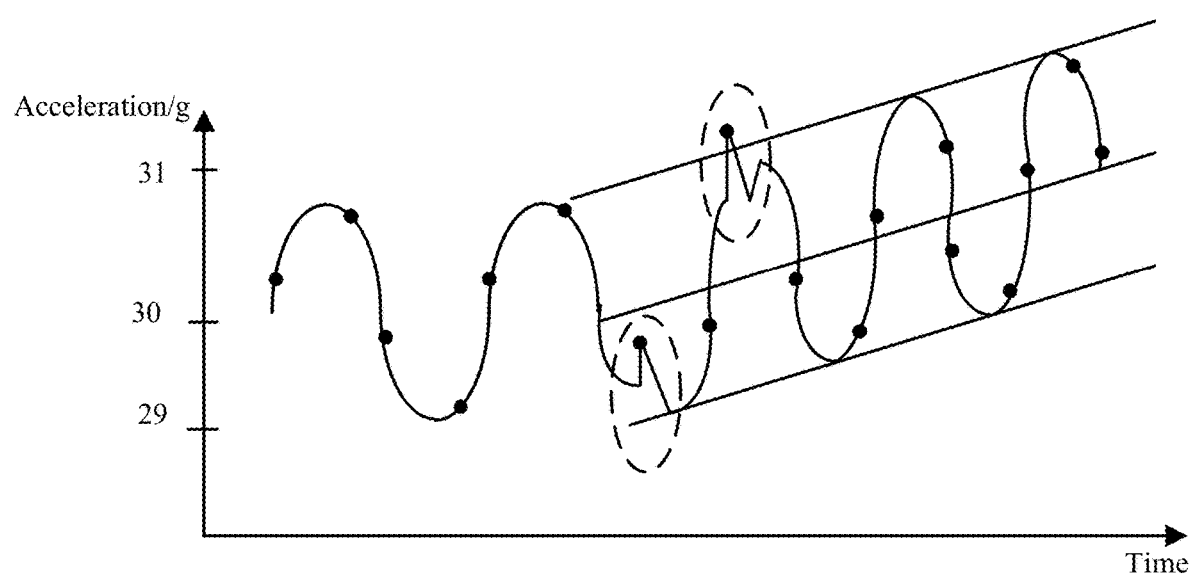
FIG. 3 (conventional)

SENSING METHOD FOR WHEEL ROTATION, WHEEL LOCALIZATION METHOD, AND WHEEL LOCALIZATION SYSTEM

RELATED APPLICATIONS

This application is a continuation of the following application, U.S. patent application Ser. No. 16/589,284, filed on Oct. 1, 2019, and which is hereby incorporated by reference as if it is set forth in full in this specification, and which also claims the benefit of Chinese Patent Application No. 201811196246.5, filed on Oct. 15, 2018, which is incorporated herein by reference in its entirety.

FIELD OF THE INVENTION

The present invention generally relates to the field of automotive electronics technology, and more particularly to sensing methods for wheel rotation, wheel localization methods, and wheel localization systems.

BACKGROUND

Tire pressure monitoring systems (TPMS) can be used to monitor the status of tires by recording the tire speed or by use of electronic sensors in the tires, in order to provide effective safety for the driving of motor vehicles. In one approach, an indirect tire pressure monitoring system can be used to determine whether the tire pressure is normal by the rotating speed difference. In another approach, a direct tire pressure monitoring system can utilize air pressure monitoring and temperature sensors in the tires. The air pressure and temperature of the tires may be monitored when the motor vehicles are driving or stationary. Alarms may go off when the tires are in a dangerous state (e.g., high pressure, low pressure, high temperature, etc.), in order to avoid potential traffic accidents caused thereby.

BRIEF DESCRIPTION OF THE DRAWINGS

FIG. 1 is a waveform diagram of an example change relationship of measurements of a Z-axis gravity acceleration meter with wheel rotation.

FIG. 2 is a waveform diagram of an example change relationship of measurements of a Z-axis gravity acceleration meter with the wheel rotation and wheel speed.

FIG. 3 is a waveform diagram of an example change relationship of the measurements of the Z-axis gravity acceleration meter with wheel rotation and wheel speed when the road is not flat.

DETAILED DESCRIPTION

Figure 4:
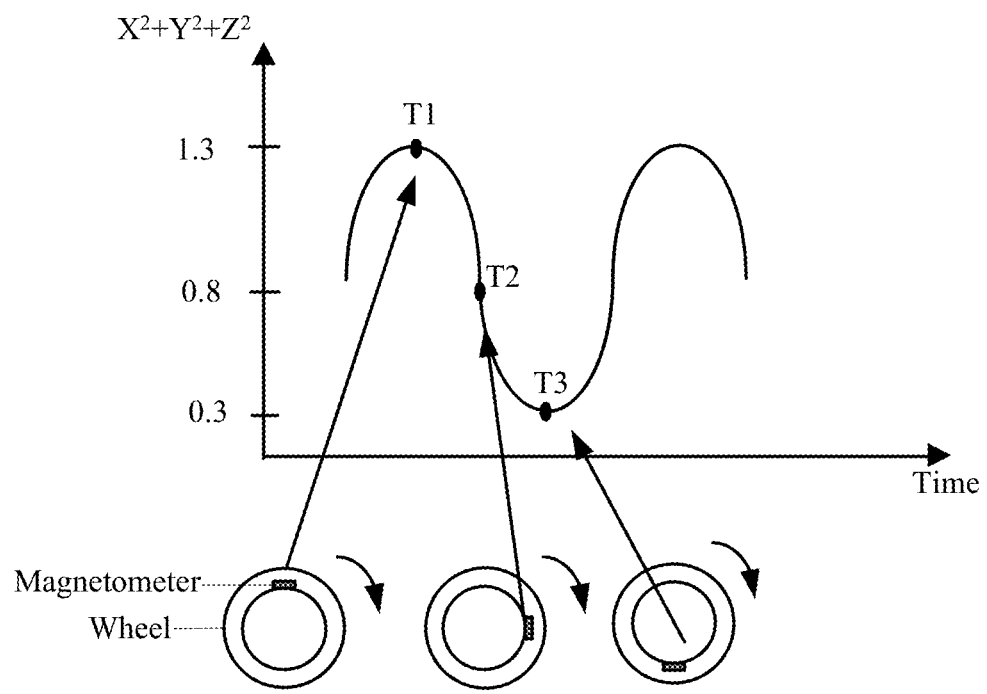
FIG. 4 is waveform diagram of an example change relationship of relative magnetic force information with wheel rotation, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A tire pressure monitoring system (TPMS) may be used to monitor tire pressure and maintain proper pressure, which can play an important role in ensuring the driving safety of vehicles. In a tire pressure monitoring system, a sensor for detecting the tire pressure may be placed in the tire, in order to transmit the detected tire pressure to the vehicle's data processor for monitoring and prompting. The TPMS can monitor pressure information of the tires through a tire pressure sensor (TPS) installed in the tires, and may report the pressure information to the vehicle driver. Since the vehicle usually has a plurality of tires, TPMS may also have an automatic localization function to inform the driver of which tire from which the pressure information is currently received.

One approach for automatic localization can include use of an angular position sensing (APS), which can enable the TPMS to calculate the rotation angle information of the wheel in which the TPS is installed based on a set of measurements of the measured acceleration received from the TPS. Then, the rotation angle information obtained by calculation of the APS may be compared against the wheel rotation derived from the sensor in the anti-lock brake system (ABS) of the vehicle, in order to obtain the location information of the wheel. One APS approach may utilize a gravity acceleration signal obtained by a gravity acceleration sensor installed on the wheel to calculate and obtain rotation angle information of the wheel.

Referring now to FIG. 1, shown is a waveform diagram of an example change relationship of measurements of a Z-axis gravity acceleration meter with wheel rotation. In this example, the measurement center value of the Z-axis gravity acceleration sensor is 30 g, where "g" is the gravitational acceleration. Also, the change value may be between −1 g and +1 g when only considering the change of the measurements caused by the wheel rotation. When the TPMS rotates to position A directly below the wheel, the acceleration may be −1 g due to its own gravity, and the corresponding measurement is 29 g. Similarly, when the TPMS is turned to position B directly above the wheel, the acceleration can be +1 g due to its own gravity, and the corresponding measurement may be 31 g. When the TPMS is turned to position C directly in the middle of the wheel, the corresponding acceleration may be just 30 g. Thus, it can be seen that the wheel rotation information may be obtained through a gravity-accelerated vehicle.

Referring now to FIG. 2, shown is a waveform diagram of an example change relationship of measurements of a Z-axis gravity acceleration meter with wheel rotation and wheel speed. The average value measured in the acceleration measurement system (e.g., the value when the TPMS is in the middle of the wheel) can change with the change of vehicle speed. Therefore, in order to obtain more accurate wheel rotation angle information, the measurement frequency of acceleration can be greater than 4 times the wheel rotation period, which may result in greater power consumption.

Referring now to FIG. 3, shown is a waveform diagram of an example change relationship of measurements of a Z-axis gravity acceleration meter with wheel rotation and wheel speed when the road is not flat. When the wheels rotate, vibrations may be generated due to different flatness of the surface of the road. Thus, noise may be added to the measurement result of the gravity acceleration sensor, as shown. This can make the wheel rotation information calculated by measurements of the gravity acceleration sensor less accurate, such that accurate automatic localization of the TPMS may not be realized. In some approaches, a gravity acceleration sensor can be used to sense a rotation angle of a wheel by sensing a change of a gravity acceleration caused by wheel rotation. However, such an approach may have relatively high power consumption and low accuracy.

In one embodiment, a method of sensing wheel rotation can include: (i) sensing magnetic force information in an environment of a wheel by a magnetometer to obtain measured magnetic force information; (ii) generating relative magnetic force information by performing mathematical operation processing in accordance with the measured magnetic force information, where the relative magnetic force information does not change with geomagnetic field and does change with a rotation angle of a wheel; and (iii) obtaining angle information related to the rotation angle of the wheel in accordance with the relative magnetic force information.

In certain embodiments, a sensing method can include arranging a magnetometer is arranged in the wheel. The measured magnetic force information sensed by the magnetometer can be transmitted to an electronic control unit. The electronic control unit can perform mathematical operation processing on the received measured magnetic force information to generate relative magnetic force information that does not change with geomagnetic field, but rather changes with the rotation angle of the wheel. Then, the electronic control unit can obtain angle information related to the rotation angle of the wheel between a first and second time points according to the change amount of the relative magnetic force information between the first and second time points.

For example, the magnetometer described may be any suitable magnetic sensor (e.g., a tunnel magneto resistance [TMR] sensor, a giant magneto resistance [GMR] sensor, an anisotropic magneto resistance [AMR] sensor, a colossal magneto resistance [CMR] sensor, etc.). For example, after the magnetometer is arranged in the wheel, the measured magnetic force information sensed by the magnetometer may include two parts. For example, one part is a geomagnetic component, which can change with the movement direction of the wheel (e.g., the wheel that goes forward in different directions), and the magnitude of the geomagnetic component in the measured magnetic force information may accordingly change, thus causing the change of the measured magnetic force information. For example, the other part is a magnetic force component generated by the vehicle itself with the wheel (e.g., generated by the engine and/or the vehicle body). The magnitude of the magnetic force may only be related to the relative position of the wheel and the vehicle (e.g., the angular position of the wheel), independent of the movement direction and the speed of the wheel. Thus, if the rotation of the wheel is directly sensed according to the change of the measured magnetic force information (e.g., the rotation of the wheel refers to the angle at which the wheel rotates in a certain time), the accuracy may not be relatively high because the measured magnetic force information may not only change with the rotation angle of the wheel, but also can relate to the geomagnetic field.

In one example, after receiving the measured magnetic force information, the electronic control unit may not directly obtain angle information related to the rotation angle of the wheel according to the change of the measured magnetic force information. Rather, the electronic control unit may first perform mathematical operation processing on the received measured magnetic force information to obtain relative magnetic force information that does not change with the geomagnetic field, but only changes with the rotation angle of the wheel. In this way, the geomagnetic component in the relative magnetic force information may not change with the movement direction of the wheel, such that the change of the relative magnetic force information may only be related to the change of the rotation angle of the wheel.

Also, the rotation angle of the wheel during this period can be accurately obtained according to the change amount of the relative magnetic force information between the first and second time points. The angle information can be directly the rotation angle of the wheel between the first and second time points; that is, the angular phase difference of the wheel between the first and second time points. Of course, the angle information can also be other parameters having a known relationship with the rotation angle of the wheel; that is, the rotation angle of the wheel between the first and second time points can be clearly obtained through the angle information and the known relationship.

When the electronic control unit performs mathematical operation processing on the measured magnetic force information to obtain the relative magnetic force information, the mathematical operation processing can be relatively simple if the magnetometer is a triaxial magnetometer. Therefore, in particular embodiments, the magnetometer can be selected as a triaxial magnetometer (also referred to as a triaxial magnetic sensor) with X-axis, Y-axis, and Z-axis. Accordingly, the measured magnetic force information can include component X on the X-axis, component Y on the Y-axis, and component Z on the Z-axis. The electronic control unit may receive components X, Y, and Z, and may perform mathematical operation processing on the three components to obtain the relative magnetic force information.

The mathematical operation can include respectively calculating the squares of components X, Y, and Z, and adding the squares of components X, Y, and Z to obtain relative magnetic force information; that is, the relative magnetic force information is $X^2+Y^2+Z^2$. The relative magnetic force information may not change with the change of geomagnetic field; that is, it may not change with the change of wheel movement direction, but may only change with the change of wheel rotation angle. Therefore, the angle information related to the rotation angle of the wheel obtained according to the relative magnetic force information may have a higher relative accuracy, and the measurement frequency may not need to be more than four times the rotation period of the wheel, as well as not causing increased power consumption.

The electronic control unit can initially fit the change relationship of the relative magnetic force information with the rotation angle of the wheel according to the change of the relative magnetic force and the corresponding rotation angle of the wheel, and may save the related information of the change relationship. This process can be regarded as correction of the relative magnetic force information. In a subsequent process, the electronic control unit can quickly obtain the corresponding change of the relative magnetic force information according to the changes of components X, Y, and Z received each time, such that the rotation angle of the wheel can be quickly obtained within a certain time period.

Referring now to FIG. 4, shown is a waveform diagram of an example change relationship of relative magnetic force information with wheel rotation, in accordance with embodiments of the present invention. Time points T1 and T2 can be the "first" group of the first and second time points, where time point T1 is the "first" time point, and time point T2 is the "second" time point. At time point T1, the wheel may rotate to a first position, at which time the magnetometer fixedly installed in the wheel can be located directly above the wheel, and the corresponding magnitude of the relative magnetic force information may be 1.3. At second time point T2, the magnetometer can rotate to the middle position of the wheel with the rotation of the wheel, and the corresponding magnitude of the relative magnetic force information may be 0.8.

Thus in this example, it can be seen that from time point T1 to time point T2, the change amount of the relative magnetic force information is 0.5, and the corresponding rotation angle of the wheel is 90°. For the "second" group of the first and second time points, time point T2 is the "first" time point, and time point T3 is the "second" time point. In this particular example, from time point T2 to time point T3, the change amount of the relative magnetic force information is 0.5, and the corresponding rotation angle of the wheel is 90°. Therefore, any two time points during the rotation of the wheel can form a group of the first and second time points, and the angle information of the wheel rotation between the two time points can be obtained according to the change information of the relative magnetic force between the first and second time points.

In order to fit the change relationship of the relative magnetic force information with the rotation angle of the wheel, the magnetometer can send the measured magnetic force information to the electronic control unit for many times (e.g., more than 20 times) continuously during the early sensing period of the wheel rotation. The electronic control unit can perform the mathematical operation process once each time the measured magnetic force information is received, in order to obtain a plurality of the relative magnetic force information corresponding to a plurality of the measured magnetic force information. Then, the electronic control unit can fit the change relationship of the relative magnetic force information with the rotation angle of the wheel according to the change amount between the plurality of the relative magnetic force information and the corresponding rotation angles of the wheel. After determining the change relationship, the electronic control unit can receive the measured magnetic force information each predetermined time (e.g., every 30 seconds), then can obtain the corresponding relative magnetic force information according to the measured magnetic force information, and may obtain the angle information according to the change amount of the relative magnetic force information and the change relationship.

Particular embodiments can also include a method of localizing the position of at least one of the plurality of wheels of a vehicle. In the example localization method, angle information related to the rotation of the at least one wheel may be needed, and the angle information can be obtained according to the example method for obtaining angle information by any one of the wheel rotation sensing methods provided herein. The example localization method can include determining angle information of the at least one wheel (e.g., a wheel to be localized among the plurality of wheels of the vehicle) according to the wheel rotation sensing method. In addition, the rotation position information related to rotation positions of each of the plurality of wheels can be obtained from an ABS unit. Further, the respective rotation information related to the rotation angle of each of the plurality of wheels between the first and second time points can be obtained according to the rotation position information. In addition, a position of the at least one wheel in the vehicle may be determined according to the comparison between the angle information and the corresponding rotation information.

For example, obtaining the rotation position information described can include obtaining a first rotation position information related to the rotation positions of each of the plurality of wheels from the ABS unit at the first time point, and obtaining a second rotation position information related to the rotation positions of each of the plurality of wheels from the ABS unit at the second time point. For example, the electronic control unit may be electronic control unit TPMS_ECU (see, e.g., FIGS. 7 and 8) in the TPMS of the vehicle. Also for example, the first and second rotation position information may be directly transmitted to electronic control unit TPMS_ECU, and electronic control unit TPMS_ECU can execute the appropriate command (e.g., calculating the difference between the first and second rotation position information to obtain the rotation information). In another example, the first and second rotation position information may be initially transmitted to anti-lock brake system control unit ABS_ECU in ABS unit of the vehicle, and anti-lock brake system control unit ABS_ECU may execute the appropriate command (e.g., calculating the difference between the first and second rotation position information to obtain the rotation information). In some examples, the appropriate command can be executed by electronic control unit TPMS_ECU.

Particular embodiments can also include estimating each estimated rotation angle of each of the plurality of wheels between the first and second time points, according to the rotation information, comparing the estimated rotation angle against a calculated rotation angle of the at least one wheel between the first and second time points obtained based on the angle information, and determining the position of the at least one wheel by matching a corresponding one of the estimated rotation angles with the calculated rotation angle according to the comparison result. In order to accurately localize the position of the at least one wheel, the position of the at least one wheel in the vehicle can be determined according to two or more groups of comparison results between the calculated rotation angle and each of the estimated rotation angles.

Figure 5:
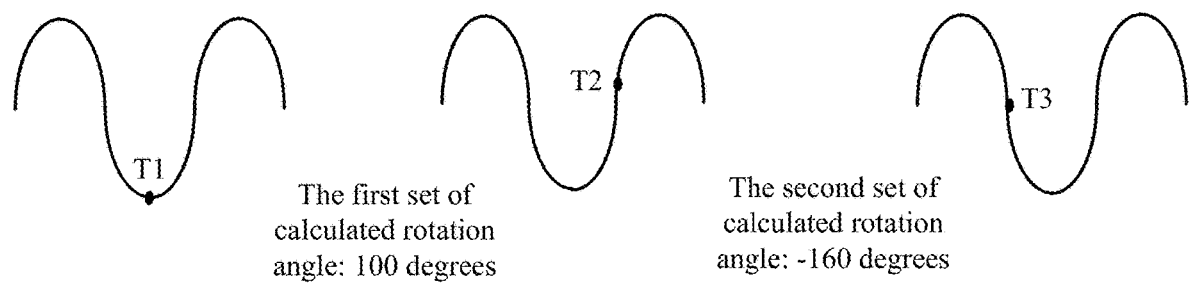
FIG. 5 is a waveform diagram of an example relationship of the wheel rotation angles at different time points calculated according to the change of the relative magnetic force information, in accordance with embodiments of the present invention.
Figure 6:
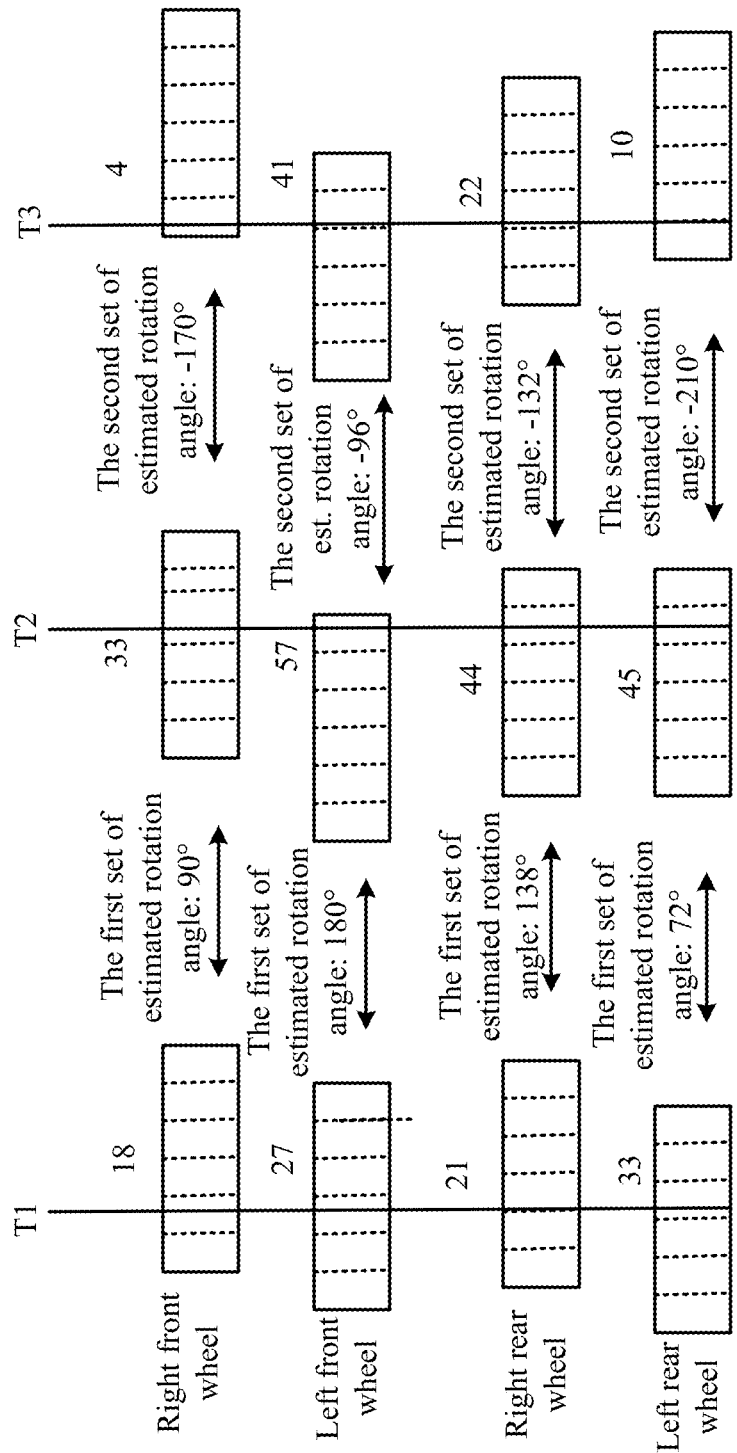
FIG. 6 is a waveform diagram of an example relationship of the wheel rotation angles at different time points obtained in accordance with embodiments of the present invention.

Referring now to FIG. 5, shown is a waveform diagram of an example relationship between a calculated rotation angle of the wheel at different time points and the relative magnetic force information, in accordance with embodiments of the present invention. Referring also to FIG. 6, shown is a waveform diagram of example relationship between estimated rotation angles of the wheels at different time points and rotation information, in accordance with embodiments of the present invention. Time points T1 and T2 may form a first group of the first and second time points, where time point T1 is the first time point, and time point T2 is the second time point. Time points T2 and T3 may form a second group of the first and second time points, where time point T2 is the first time point and time point T3 is the second time point. As shown in FIG. 5, the first set of the calculated rotation angle corresponding to the first group of the first and second time points is 100°, and the second set of calculated rotation angle corresponding to the second group of first and second time points is −160°.

In addition, each of the rotation information can be "teeth" count information on the change number of the wheel teeth rotated corresponding to one of the wheels between the first and second time points. The first rotation position information may be the first teeth number for the number of wheel teeth rotated corresponding to each of the wheels at the first time point, and the second rotation position information can be the second teeth number for the number of wheel teeth rotated corresponding to each of the wheels at the second time point. As shown in FIG. 6, the plurality of wheels can include a right front wheel, a left front wheel, a right rear wheel, and a left rear wheel. In the first group of first and second time points, at time point T1, the respective first teeth number corresponding to the right front wheel, the left front wheel, the right rear wheel, and the left rear wheel can be 18, 27, 21, and 33, respectively. At time point T2, the respective second teeth number corresponding to the right front wheel, the left front wheel, the right rear wheel, and the left rear wheel can be 15, 30, 23, and 12, respectively. Then, estimated rotation angles in the first group corresponding to the right front wheel, the left front wheel, the right rear wheel, and the left rear wheel can be 90°, 180°, 138°, and 72°, respectively.

Thus, from the comparison between the first set of calculated rotation angle and the first group of estimated rotation angles in this example, it can be seen that the estimated rotation angle of the right front wheel may be closest to the first set of calculated rotation angle, and the at least one wheel can be determined to be the right front wheel of the vehicle. In order to further determine the result, further judgment can be made according to the comparison between the corresponding second set of the calculated rotation angle and each of the estimated rotation angles in the second group of the first and second time points (e.g., time points T2 and T3). In the second group of the first and second time points, at time point T2, the respective first teeth number corresponding to the right front wheel, the left front wheel, the right rear wheel, and the left rear wheel can be 33, 57, 44, and 45, respectively. At time point T3, the respective second teeth number corresponding to the right front wheel, the left front wheel, the right rear wheel, and the left rear wheel can be 4, 41, 22, and 10, respectively. Since the total change number of teeth in one turn of the wheel is 60 in this example, the total number of the teeth of each wheel is 60.

Then, in the second group of first and second time points, the respective second set of rotation information corresponding to the right front wheel, the left front wheel, the right rear wheel, and the left rear wheel (that is, the second set of teeth number for the number of the teeth rotated) can be 31, 44, 38, and 25, respectively. Estimated rotation angles in the second group corresponding to the right front wheel, the left front wheel, the right rear wheel, and the left rear wheel can respectively be −174°, −96°, −132°, and −120°. Thus, from the comparison between the second set of calculated rotation angle and the second group of estimated rotation angles, it can be seen that the estimated rotation angle of the right front wheel is still closest to the second set of calculated rotation angle, and the at least one wheel can be further determined to be the right front wheel of the vehicle.

In one embodiment, an apparatus for localizing at least one wheel of a vehicle can include: (i) at least one magnetometer arranged in at least one wheel, and being configured to obtain measured magnetic force information; (ii) an ABS unit configured to provide rotation position information related to rotation positions of each wheel; and (iii) an electronic control unit configured to generate relative magnetic force information in accordance with the measured magnetic force information, obtain angle information related to the rotation angle of the wheel in accordance with the relative magnetic force information, obtain rotation information of the rotation angles of each wheel in accordance with the rotation position information, and determine a position of the wheel in the vehicle by comparing the angle information against each rotation information, where the relative magnetic force information does not change with geomagnetic field and does change with a rotation angle of a wheel.

Figure 7:
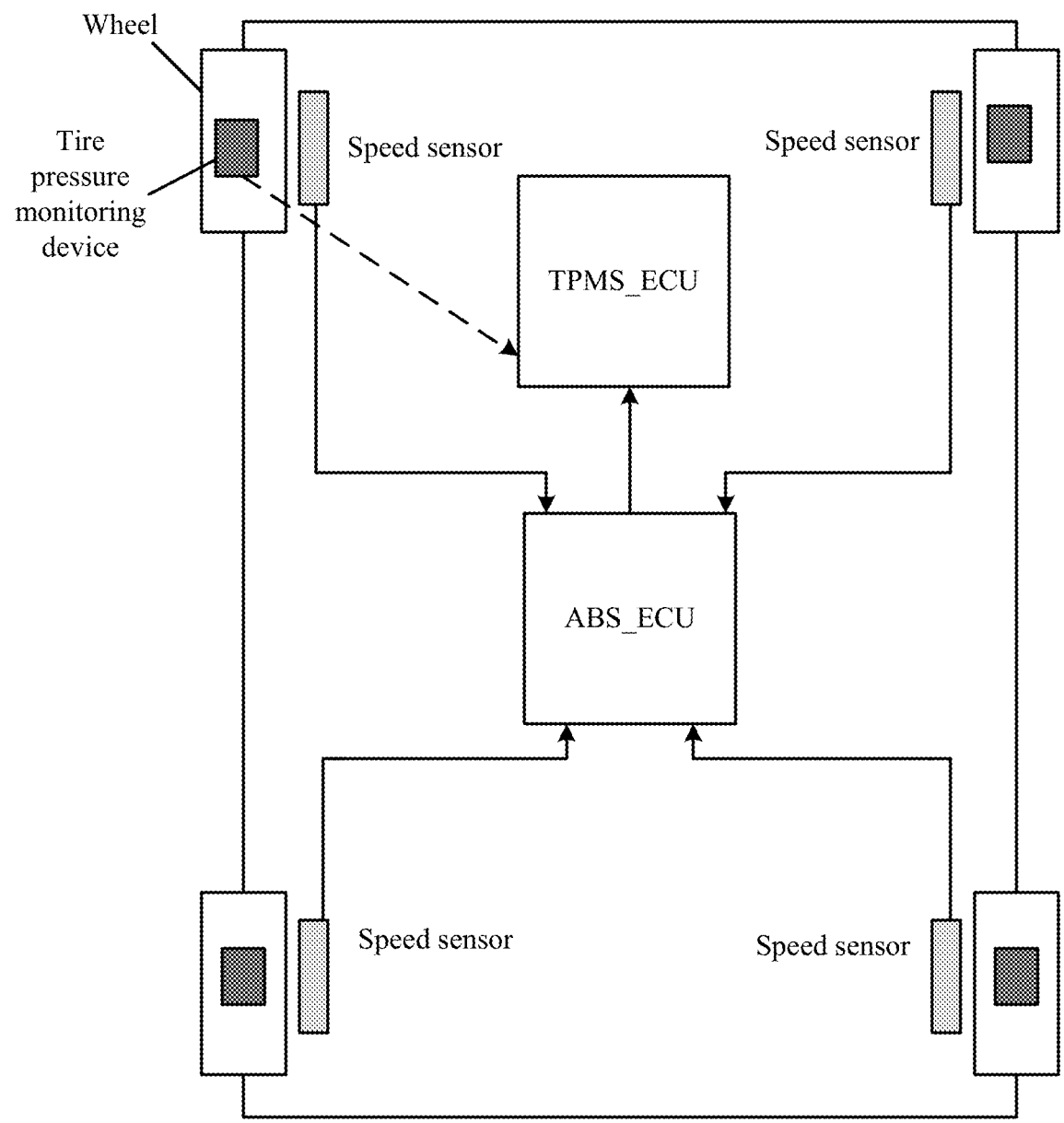
FIG. 7 is a schematic block diagram of an example wheel localization system, in accordance with embodiments of the present invention.

Referring now to FIG. 7, shown is a schematic block diagram of an example wheel localization system, in accordance with embodiments of the present invention. The system can localize the position of at least one of a plurality of wheels of a vehicle. The localization system can include a magnetometer arranged in at least one wheel for sensing the measured magnetic force information in the environment in which at least one wheel is located. Here, the measured magnetic force information can include a geomagnetic component which changes with the movement direction of at least one wheel and a magnetic force component generated by the vehicle. The localization system may also include electronic control unit TPMS_ECU, which can perform mathematical operation processing according to the received measured magnetic force information, generating relative magnetic force information which may not change with geomagnetic field but changes with the rotation angle of at least one wheel, and obtaining angle information related to the rotation angle of the wheel according to the change of the relative magnetic force information between the first and second time points. In addition, the localization system can also include an ABS unit that can provide the electronic control unit with rotation position information related to the rotation position of each of the plurality of wheels. The electronic control unit can obtain each rotation information related to the rotation angle of each wheel between the first and second time points based on the rotation position information, and can determine the position of the at least one wheel in the vehicle according to the comparison between the angle information and the corresponding rotation information.

Each of the plurality of wheels may need to be localized, and thus each wheel of the vehicle may be provided with a magnetometer. Also, a tire pressure monitoring device can be provided for the wheel to monitor the tire pressure, and the magnetometer can be a part of the tire pressure monitoring device. In this example, the tire pressure monitoring device shown in FIG. 7 can include the magnetometer described. For example, electronic control unit TPMS_ECU can form a TPMS of the vehicle together with the tire pressure monitoring device. Electronic control unit TPMS_ECU can obtain the measured magnetic force information from the magnetometer through wireless or wired reception, and may further receive the measured magnetic force information each predetermined time (e.g., 30s), and may obtain the relative magnetic force information according to the measured magnetic force information received each time. In addition, the localization system can also include a tire pressure sensor that can be arranged in the tire pressure monitoring device, and can generate tire pressure information related to tire pressure of at least one tire to electronic control unit TPMS_ECU. After determining which wheel the tire pressure information comes from, electronic control unit TPMS_ECU may transmit the identification name of the tire pressure sensor to the wheel.

The ABS unit can include rotation speed sensors installed in each wheel of the vehicle and control unit ABS_ECU. Each of the rotation speed sensors can obtain rotation speed sensing information related to the rotation speed of the wheel teeth of each corresponding wheel. Control unit ABS_ECU may obtain each of the corresponding rotation position information according to each of the rotation speed sensing information, and can generate the rotation position information to electronic control unit TPMS_ECU. For example, if the ABS unit provides the electronic control unit with the first rotation position information related to the rotation position of each wheel at the first time point, and the second rotation position information related to the rotation position of each wheel at the second time point, electronic control unit TPMS_ECU can calculate the difference between the first and second rotation position information to obtain the rotation information. Each of the rotation information can include teeth count information on the change number of the wheel teeth rotated corresponding to one of the wheels between the first and second time points. Thus, each of the first rotation position information can be the first teeth number of the wheel teeth rotated corresponding to each wheel at the first time point (e.g., 18, 27, 21, and 33 in FIG. 6), and each of the second rotation position information can be second teeth number of the wheel teeth rotated corresponding to each wheel at the second time point (e.g., 33, 57, 44, and 45 in FIG. 6).

Electronic control unit TPMS_ECU can obtain the position of at least one wheel according to the calculation and comparison between the angle information and the respective rotation information according to the exemplified localization method. It should be understood that the magnetometer in the localization system can be an magnetometer as described herein, and electronic control unit TPMS_ECU can be the electronic control unit as described herein. As such, electronic control unit TPMS_ECU can obtain the angle information according to the measured magnetic force information.

Figure 8:
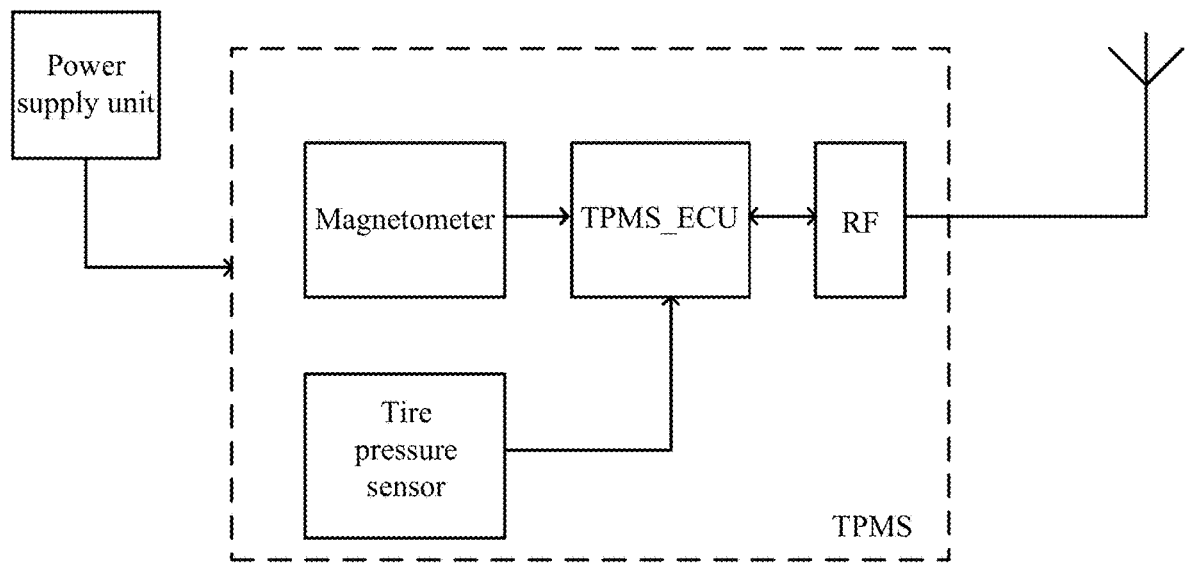
FIG. 8 is a schematic block diagram of an example tire pressure measurement system, in accordance with embodiments of the present invention.

Referring now to FIG. 8, shown is a schematic block diagram of an example tire pressure measurement system, in accordance with embodiments of the present invention. The tire pressure measurement system can include magnetometers, tire pressure sensors, and electronic control unit TPMS_ECU. The magnetometers can be arranged in at least one of a plurality of wheels of the vehicle, and may obtain measured magnetic force information in the environment in which the at least one wheel is positioned. The tire pressure sensors can be arranged in at least one of the plurality of wheels of the vehicle, and may obtain tire pressure information related to the tire pressure of the at least one wheel. Electronic control unit TPMS_ECU can receive the measured magnetic force information, tire pressure information, and rotation position information related to rotation positions of each wheel provided by an ABS unit of the wheel, in order to perform localization of the wheel according to the measured magnetic force information and the rotation position information. Then electronic control unit TPMS_ECU can provide an identification name of the tire pressure sensor to the wheel.

In particular embodiments, electronic control unit TPMS_ECU can perform a mathematical operation on the measured magnetic force information to obtain relative magnetic force information which does not change with geomagnetic field but changes with the rotation angle of the at least one wheel, and may obtain angle information related to the rotation angle of the wheel between the first and second time points according to the change amount of the relative magnetic force information between the first and second time points. Also, electronic control unit TPMS_ECU can obtain each of the rotation information related to the rotation angle of each of the plurality of wheels between the first and second time points according to the rotation position information, and may perform localization of the wheel according to the comparison between the angle information and each of the rotation information.

In addition, the TPMS can include radio frequency unit RF for performing signal transmission with electronic control unit TPMS_ECU, an antenna connected to radio frequency unit RF, and a power supply unit for supplying power to the system, such as battery. In combination with the description of the localization method and the localization system provided herein, the TPMS can realize tire pressure monitoring while achieving automatic wheel localization. The electronic control unit can obtain the relative magnetic force that does not change with geomagnetic field through the mathematical operation processing on the measured magnetic force obtained by the magnetometer, and can obtain angle information and wheel position information according to the relative magnetic force information. Since the relative magnetic force information may not change with different directions of the wheel rotation, but only changes with the wheel rotation angle, the obtained angle information and the position information may have relatively high accuracy.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A tire pressure monitoring system (TPMS) for a vehicle, the system comprising:
   a) at least one magnetometer arranged in at least one wheel of the plurality of wheels of the vehicle, and being configured to obtain measured magnetic force information in the environment in which the at least one wheel is positioned;
   b) a tire pressure sensor arranged in at least one of the plurality of wheels of the vehicle to obtain tire pressure information related to the tire pressure of the vehicle;
   c) an electronic control unit configured to receive the measured magnetic force information, tire pressure information, and a rotational position related to rotational positions of each wheel provided by an anti-lock braking system (ABS) unit of the wheel information, and to determine which wheel in the plurality of wheels the wheel comes from according to the measured magnetic force information and the rotational position information, and then assigning the identification name of the tire pressure sensor to the wheel; and d) wherein the electronic control unit is configured to perform mathematical operations on the measured magnetic force information to obtain relative magnetic force information, obtain the angle information related to the rotation angle of the wheel according to the change amount of the relative magnetic force information, obtain rotation information of the rotation angles of each wheel in accordance with the rotation position information, estimate an estimated rotation angle of each wheel between a first and second time points in accordance with the rotation information, and to perform localization of the wheel by matching an estimated rotation angle to a calculated rotation angle obtained in accordance with the angle information between the first and the second time points, wherein the electronic control unit is configured to determine the position of the wheel in the vehicle in accordance with more than two sets of the comparison between the calculated rotation angle and each of the estimated rotation angles.

2. The system of claim 1, wherein the relative magnetic force information does not change with geomagnetic field and does change with a rotation angle of a wheel.

3. The system of claim 1, wherein the electronic control unit is configured to:
a) obtain the angle information on the rotation angle of the wheel between the first time point and the second time point in accordance with a change of the relative magnetic force information between the first and the second time points; and
b) obtain rotation information on the rotation angles of each wheel between the first and second time points in accordance with a change of the rotation position information between the first and second time points.

4. The system of claim 1, wherein:
a) the magnetometer comprises a triaxial magnetometer;
b) the measured magnetic force information comprises a first component on a first axis, a second component on a second axis, and a third component on a third axis; and
c) the electronic control unit is configured to perform a mathematical operation processing based on the first, second, and third components to obtain the relative magnetic force information.

5. The system of claim 4, wherein the mathematical operation processing comprises:
a) respectively calculating squares of the first, second, and third components; and
b) adding the square of the first component, the square of the second component, and the square of the third component, in order to obtain the relative magnetic force information.

6. The system of claim 1, wherein after the system is started, the electronic control unit is configured to perform a mathematical operation processing each time after receiving each of a plurality of measured magnetic force information continuously transmitted by the magnetometer for a plurality times, in order to obtain a plurality of corresponding relative magnetic force information, and to fit a change relationship of the relative magnetic force information with the rotation angle of the wheel.

7. The system of claim 6, wherein the electronic control unit is configured to receive the measured magnetic force information each predetermined time after the change relationship is determined to obtain the relative magnetic force information, and obtain the angle information in accordance to a change of the relative magnetic force information and the change relationship.

8. The system of claim 1, wherein:
a) the ABS unit is configured to provide first rotation position information on rotation positions of each wheel at the first time point, and second rotation position information on rotation positions of each wheel at the second time point for the electronic control unit; and
b) the electronic control unit is configured to obtain the rotation information in accordance with a difference between the first and second rotation position information.

9. The system of claim 1, further comprising:
a) a radio frequency unit for signal transmission with the electronic control unit;
b) an antenna connected to the radio frequency unit; and
c) a power supply unit for powering the system.

10. An apparatus for localizing at least one wheel of a vehicle, the apparatus comprising:
a) at least one magnetometer arranged in at least one wheel, and being configured to obtain measured magnetic force information;
b) an anti-lock brake system (ABS) unit configured to provide rotation position information related to rotation positions of each wheel; and
c) an electronic control unit configured to generate relative magnetic force information in accordance with the measured magnetic force information, obtain angle information related to the rotation angle of the wheel in accordance with a change of the relative magnetic force information, obtain rotation information of the rotation angles of each wheel in accordance with the rotation position information, and estimate an estimated rotation angle of each wheel between a first and second time points in accordance with the rotation information, and to perform localization of the wheel by matching an estimated rotation angle to a calculated rotation angle obtained in accordance with the angle information between the first and the second time points, wherein the electronic control unit is configured to determine the position of the wheel in the vehicle in accordance with more than two sets of the comparison between the calculated rotation angle and each of the estimated rotation angles.

* * * * *